United States Patent [19]

Larsen et al.

[11] 4,132,683

[45] Jan. 2, 1979

[54] PROCESS OF PREPARING POLYFURAN FOAMS

[75] Inventors: Hans-Ole Larsen, Farum; Sven Barfoed, Copenhagen, both of Denmark; John A. G. Gent, Liphook, England

[73] Assignee: Koninklijke Emballage Industrie Van Leer BV, Amstelveen, Netherlands

[21] Appl. No.: 727,325

[22] Filed: Sep. 27, 1976

Related U.S. Application Data

[63] Continuation-in-part of Ser. No. 516,705, Oct. 21, 1974, abandoned, which is a continuation of Ser. No. 288,883, Sep. 13, 1972, abandoned.

[30] Foreign Application Priority Data

Sep. 15, 1971 [GB] United Kingdom ............... 43033/71

[51] Int. Cl.² .............................................. C08J 9/00
[52] U.S. Cl. .................................. 521/106; 521/186; 521/189
[58] Field of Search .................................. 260/2.5 FR

[56] References Cited

U.S. PATENT DOCUMENTS

| 3,390,107 | 6/1968 | Tashlick | 260/2.5 F |
|---|---|---|---|
| 3,779,955 | 12/1973 | Wade | 260/2.5 F |

*Primary Examiner*—John Kight, III
*Attorney, Agent, or Firm*—Lawrence Rosen; E. Janet Berry

[57] ABSTRACT

Improved polyfuran foams are prepared by polymerizing or copolymerizing furfuryl alcohol, alone or in combination with prepolymers or precopolymers of furfuryl alcohol, as liquid feed material in the presence of a liquid acidic compound, the liquid feed material containing at least 20% of free furfuryl alcohol and wherein at least 50% of the hydroxyl groups in the mixture are present as free furfuryl alcohol. The liquid acidic compound or mixture of acidic compounds having a pKa value in water of from 1 to 4 or having a pka value in water of less than 1 and being uniformly distributed in mono alcohols that do not polymerize in the presence of said acidic compound or mixture of acidic compounds. The polyfuran foam having non-flammability characteristics as determined by the muffle furance test.

6 Claims, No Drawings

PROCESS OF PREPARING POLYFURAN FOAMS

This application is a continuation-in-part of application Ser. No. 516,705 filed Oct. 21, 1974, now abandoned which was a continuation of application Ser. No. 288,883 filed Sept. 13, 1972, now abandoned.

The present invention relates to a process of preparing polyfuran foams by polymerizing or copolymerizing furfuryl alcohol either alone or in combination with prepolymers or precopolymers of furfuryl alcohol as liquid feed material in the presence of a liquid acidic compound or a mixture of acidic compounds.

From U.S. Pat. No. 3,390,107 (Tashlick) is known already to prepare foams from furfuryl alcohol resins containing low amounts of furfuryl alcohol monomer. According to said process rigid, cellular, expanded furan resins are prepared by expanding a preformed liquid furan resin in the presence of an acid catalyst and a blowing agent.

The blowing agent and the acid catalyst are dispersed uniformly in a furan resin and then the composition is allowed to exotherm. Furan resins used are those prepared from the sole condensation of furfuryl alcohol and furfural and resins or furfuryl alcohol and formaldehyde. The average viscosity of said resins is 5000 to 10,000 cps at 23° C. Phosphoric acid may be used as the acid catalyst. The cellular materials prepared are generally of a partially open cell structure. Depending on the specific process conditions employed, cellular material having a specific gravity from 0.016–0.56 is obtained. Said known products show characteristics which are undesirable for many applications. For example, 1. The foams readily burn at temperatures of 400°–500° C.
2. Those foams produced at economical specific gravities resist progressing flames for a short time only.
3. An extended cure is required to make the resins tackfree.
4. The foams show a high percentage of open cells with all the concomitant absorption, permeation and insulation properties.
5. The foams are predominantly prepared from prepolymers involving an additional complicated process step.

Further from U.S. Pat. No. 3,567,662 a method is known for preparing a furan foam product by mixing furfuryl alcohol with an antifreeze solvent (methanol, ethanol, toluene or secundary butylalcohol), adding a surfactant to said mixture and subsequently mixing rapidly said mixture with a Friedel Crafts type catalyst. Instantaneously expansion and curing occur. The density of the foamed products obtained ranges from 48 to 167 kg/m². Due to the presence of a non reactive (or non reacted) alcohol in the furfuryl alcohol which leads to cell collapse during the rise and cure, the quality of the foams, particularly if they are prepared at room temperature, is poor. Moreover due to the fact that the addition and distribution of the strong acidic catalysts is very difficult, the formation of hard lumps in the foam can hardly be avoided.

It has now been found that these undesirable features can be avoided and further that a foam material having several additional very desirable properties can be obtained by polymerizing or copolymerizing furfuryl alcohol in a single step, either alone or in combination with prepolymers or precopolymers of furfuryl alcohol by (a) utilizing as the liquid feed material a furfuryl alcohol-containing mixture, substantially free of other alcohols, wherein at least 50% of the hydroxyl groups in the mixture are present as free furfuryl alcohol, said mixture having a maximum viscosity of 1150 cp at 25° C. when containing about 50% hydroxyl groups as free furfuryl alcohol; and (b) adding the acidic compound or mixture of acidic compounds to the feed material, said acidic compound or mixture of acidic compounds having a pKa value in water of from 1 to 4; to obtain a stable, low density polyfuran foam having non-flammability characteristics as determined by the muffle furnace test, alternatively adding the acidic compound or mixture of acidic compounds to the feed material, said acidic compound or mixture of acidic compounds having a pKa value in water of less than 1 and being uniformly distributed in monoalcohols and glycols that do not polymerize in the presence of said acidic compounds or mixture of acidic compounds; to obtain a stable, low density polyfuran foam having non-flammability characteristics as determined by the muffle furnace test. Said acidic compound or compounds having a pKa value in water from 1 to 4 are preferably distributed uniformly in monoalcohols or glycols that do not polymerize in the presence of the acidic compound used.

The furfuryl alcohol used preferably contains not more than 5% by weight of water.

Small amounts of impurities may be present. Generally the commercially available quality may be used. Other components which will copolymerize with the furfuryl alcohol under the conditions of the foam formation may be present. Examples of such components are furfural and formaldehyde. Also the known prepolymers and/or precopolymers of furfuryl alcohol may be used, but it is an essential feature of the invention that at least 50% of the hydroxy groups present in the furfuryl alcohol prepolymer mixture originate from free furfuryl alcohol.

Preferably a starting material is used in which at least 75% of the hydroxy groups present in the furfuryl alcohol prepolymer mixture originate from free furfuryl alcohol. The percentage of hydroxy groups is calculated from hydroxylgroup determination by known methods such as ASTM Nr.D 1638. The term furfuryl alcohol prepolymer mixture in this context is to be understood as including furfuryl alcohol only. The furfuryl alcohol containing mixtures used in the present invention have preferably a viscosity of less than 600 cp at 25° C. Particularly preferred are mixtures having a viscosity of less than 250 cp at 25° C. and mixtures containing at least 20% of free furfuryl alcohol.

The pKa value of the acidic compounds used in preferably less than 2.5.

Typical examples of proper acidic compounds are formic acid (pKa = 3,74), orthophosphoric acid (pKa = 2.12), polyphosphoric acid (pKa = 0.85) and hydrochloric acid (pKa = −7). Generally an oxy-acid of phosphorus is used in combination with another acid, such as sulphuric acid or p-toluene sulphonic acid, but an oxy-acid of phosphorus can be used as the only acidic catalyst.

Preferably the acidic compound is used in combination with an alcohol or a glycol.

The preferred monoalcohol is propane-2-ol. The preferred glycols are diols, such as 1.4-butanediol; other preferred alcohols are polyglycols such as dipropylene glycol and polyethylene glycol.

The known foams have generally to be aftercured at elevated temperatures, and making stable foams of low density requires a reaction mixture of high initial viscosity. Surprisingly, it has been found that with the present invention, stable uniform foams of ultralow density can be made directly from furfuryl alcohol or furfuryl alcohol prepolymer mixtures of low viscosity by using rather large proportions of acidic compounds uniformly distributed in an alcohol, which foams do not need an aftercure.

The known foams are prepared using a volatile liquid, such as Freon 113, as a blowing agent, the density of those foams obtained being directly dependent on the amount of blowing agent used.

In contrast thereto such blowing agents are not essential in the preparation of foams according to the invention, but they may be used.

Surprisingly, the density of foams prepared in the presence of a blowing agent do not differ essentially from those prepared in absence of such blowing agents. The only difference observed is that generally the cells of the foams prepared with such blowing agents are smaller than when such blowing agents are not used. The addition of formaldehyde or a mixture forming formaldehyde in situ has been found to result in lowering the density of the foam, the formaldehyde possibly acting as a blowing agent or a foam stabilizing agent.

A preferred source of formaldehyde is paraformaldehyde.

Foams with outstanding non-flammability characteristics as determined by the muffle furnace test and the propane torch test hereinafter described are preferred and may be prepared from a staring material containing a mixture of furfuryl alcohol monomer and 5-6% of an oxy-acid of phosphorus, preferably phosphoric acid, calculated on the total weight of the prepolymer and furfuryl alcohol used, wherein at least 50% of the hydroxy groups present in the mixture originate from free furfuryl alcohol. If a furan foam is prepared from furfuryl alcohol resins containing a small percentage of furfuryl alcohol, so that less than 50% of the hydroxy groups present in the mixture originate from free furfuryl alcohol, even a very high amount of phosphoric acid, e.g. 15% by weight, will not yield a foam that will pass the above mentioned inflammability tests.

However, if the resin contains higher amounts of furfuryl alcohol, smaller amounts of phosphoric acid, e.g. 4-5% by weight, will be sufficient to produce a foam that will pass the abovementioned tests.

Rather large amounts of solid fillers can be used in the starting materials without adverse effects on the foaming process and the stability of the foam. Particularly the non-burning properties can be improved to a remarkable extent. For instance a foam containing 30% kaolin can be made which will not burn through at all in the propane torch test, because of the formation of an inorganic (ceramic) skeleton that glows white-hot in the flame but remains stable. Upon cooling the skeleton will turn into a white powder.

Other useful fillers in this respect are vermiculite and some types of clay. A ferromagnetic foam can be obtained by use of a black ironoxide as filler. Another preferred filler is magnesium sulfate monohydrate. Surfactants such as for example silicones used in the preparation of polyurethane foams may be incorporated in the starting mixture as cell control agents. Generally the reaction is performed at room temperature, but it may be carried out also increased temperatures. The foams prepared according to the present invention have several attractive features. They are not only chemically inert (can stand strong acids and alkalis), but they are also prepared from cheap and readily available raw materials in a one step process. Other desirable features, which are achieved, are:

flame and high temperature resistance superior to those known in the art;
good thermal insulation values;
higher percentage of closed cells than present in the known furan foams;
ultralow specific gravity down to 0.002;
cream and rise times which can be controlled within very wide limits. Substantially instantaneous rising is possible in a controlled manner;
a succession of batches can be formed on top of each other with good bonding;
very short times to reach the tack-free stage in comparison with those quoted in prior art;
fully cured state without aftercure heat treatment.

The foams prepared according to the present invention may be used for, without being limited to, all those cases in which thermal and/or acoustical insulation; fire-protection and/or fire-containment and/or fire-elimination are required; for packaging purposes; and in general where the characteristics of the foam can be brought to bear.

The invention will now be illustrated by way of examples in order to make it understandable to those skilled in the art. These examples should not be construed as limiting the invention in any form of fashion.

EXAMPLE 1

Furan foams were prepared using a commercial furfuryl alcohol resin (Durez 16470) containing 5% by weight of free furfuryl alcohol and diluted with 15% by weight of free furfuryl aldehyde to give a viscosity of 200 cps at 23° C.

This was called resin A1.

Furfuryl alcohol was added to part of resin A 1 to give mixtures containing 25% by weight and 50% by weight free furfuryl alcohol, called resin A 2 and resin A 3, respectively.

Hydroxyl values were determined on the resin using the ASTM method Nr.D 1638. From these values the percentage of hydroxyl groups originating from free furfuryl alchol in each resin was calculated, giving the following values, A 1: 20%, A 2: 61%, A, 3: 82%.

From each of the three resins four foams were prepared using different amounts of acid catalyst as shown in Table A. The formulation in all the preparations was:

| Resin | 50 gram |
|---|---|
| Silicone surfactant | 1 gram |
| Paraformaldehyde | 2 gram |
| Pulverized flint | 10 gram |
| Freon 113 | 6 gram |

TABLE A

| Foam No. | % by weight free furfurylalcohol in resin | Butanediol parts by weight per 100 parts by weight resin | O-phosphonic acid (89%) parts by weight per 100 parts resin by weight | Para Toluene sulphonic acid by weight per 100 parts resin by weight | Density of foam kg/m³ | Muffle furnace test at 650° C Time to ignite in sec. | Time to extinguish in sec. | % residue (w/w) after test | Propane torch test Time to burn through through a 25 mm sample, in sec. | Time to burn through reduced to unit density sec./kg/m³ |
|---|---|---|---|---|---|---|---|---|---|---|
| 1 | 5 | 0 | 6 | 4 | 41 | 2 | >120 | 33 | 300 | 7.3 |
| 2 | 25 | 0 | 6 | 4 | 22 | >120 | | 26 | 175 | 8.0 |
| 3 | 50 | 0 | 6 | 4 | 13 | >120 | | 26 | 133 | 10.2 |
| 4 | 5 | 4 | 6 | 4 | 48 | 1 | >120 | 41 | 120 | 2.5 |
| 5 | 25 | 4 | 6 | 4 | 35 | 1 | >120 | 29 | 162 | 4.6 |
| 6 | 50 | 4 | 6 | 4 | 14 | >120 | | 31 | 132 | 9.4 |
| 7 | 5 | 0 | 10 | 2 | 36 | 2 | >120 | 32 | 297 | 8.3 |
| 8 | 25 | 0 | 10 | 2 | 24 | 1 | 5 | 27 | 283 | 11.8 |
| 9 | 50 | 0 | 10 | 2 | 13 | >120 | | 24 | 152 | 11.7 |
| 10 | 5 | 4 | 10 | 2 | 137 | 3.5 | >120 | 57 | 300 | 2.2 |
| 11 | 25 | 4 | 10 | 2 | 49 | 3 | 7 | 34 | 400 | 8.2 |
| 12 | 50 | 4 | 10 | 2 | 22 | 1 | 7 | 32 | 158 | 7.2 |

Muffle furnace test

The foams were left for two days before cubes 25 mm by 25 mm by 25 mm were cut out for the muffle furnace test. A standard horizontal muffle furnace having internal dimensions of 300 × 170 × 100 mm (Heraeus type HR 170) was set at 650° C. The door was left open during the test to allow observation, but to reduce draft the upper 60% of the door opening was covered by a piece of thin aluminium plate insulated with mineral wool. The sample was placed on a wire mesh stand outside the furnace, and the stand was then rapidly pushed into the oven. The results are stated in table A.

Samples 1, 4, 7 and 10 containing only 5% by weight furfuryl alcohol ignite almost immediately and burn for the entire test period both with 6 and 10 parts phosphoric acid.

From the results of the samples containing 25 and 50% by weight furfuryl alcohol it will appear that 25% by weight furfuryl alcohol and 6 parts by weight phosphoric acid is sufficient to give a foam that will not burn at all (sample 2). If also butanediol is present the foam will burn (sample 5). This tendency to burning when the diol is present can be compensated either by increasing the amount of furfuryl alcohol to 50% by weight (sample 6) or the amount of phosphoric acid from 6 to 10 parts by weight (sample 11). The foams made from resin with 50% by weight furfuryl alcohol will, apart from sample 12, not burn. Foams 8 and 12 give a very short flame immediately after being placed in the furnace and may when compared with foams 2 and 6 suggest the existence of an upper limit for the amount of phosphoric acid which will work.

Propane torch test (US Bureau of Mines)

A propane flame is directed onto the sample to be tested as illustrated in the fig. To compare results from foams with different densities the actual burn-through time is divided by the density, and a result of burn-through time at "unit-density" is obtained (sec./kg/m³).

In the figure the symbols A-F have the following meanings:

A filter paper
B heat checking nonflammable plate
C sample-holder
D foam sample (150 × 150 × 25,4 mm)
E spec.propane gas burner
F propane gas-supply

EXAMPLE 2

A. Preparation of furfuryl alcohol resins 2000 g furfuryl alcohol, 200 g water and 9.55 g $H_3PO_4$ (89% by weight) were mixed in a 3 l flask provided with stirrer, thermometer, reflux condenser and heating mantle.

The mixture was heated to 100° C. over a period of 25 min; then the heating mantle was removed and the temperature was kept at 100°–106° C. by the exotherm reaction taking place. After 40 min at 100°–106° C. 48 cm³ of a 10% (w/w) NaOH solution were added, and the reaction mixture was cooled to room temperature. The aqueous layer was discarded, and residual water was removed by vacuum distillation. The yield was 1818 g resin having a viscosity of 23 cps at 25° C., and containing about 55% by weight free furfuryl alcohol.

b. Preparation of foam.

By a standard procedure and a standard formulation a number of foams were prepared using various alcohols as diluents for the acid catalyst.

The foams were prepared by mixing 50 g of a furfuryl alcohol resin, prepared as described under a. (foams 1 and 2 were made from a resin prepared in the same way but with a lower content of free furfuryl alcohol: 45% by weight) with 2 g paraformaldehyde, 1 g of a silicone surfactant, and 5 g talc in a polystyrene beaker of 500 cm³.

The composition of the catalyst was varied and the amount adjusted to give the same cream time. Details are given in table 3. The catalyst was added quickly from a syringe, and the mixing continued until the temperature has risen to 50° C. The mixture was then poured into an aluminium beaker and allowed to rise.

Table B

| Foam No | $H_3PO_4$ g (89%) | $H_2SO_4$ g | paratoluene sulphonic acid g | alcohol g | type |
|---|---|---|---|---|---|
| 1 | 1.65 | 1.65 | — | 3.3 | n-Butanol |
| 2 | 6 | — | 3 | 4.5 | 1.4 Butanediol |
| 3 | 2.25 | 2.25 | — | 4.5 | dipropyleneglycol |
| 4 | 6 | — | 3 | 4.5 | dipropyleneglycol |
| 5 | 2.8 | 2.8 | — | 4.5 | Caradol 300 |
| 6 | 6 | — | 3 | 4.5 | Caradol 300 |
| 7 | 1.8 | 1.8 | — | 4.5 | Dodecylalcohol |
| 8 | 4.6 | — | 2.2 | 4.5 | Dodecylalcohol |
| 9 | 2.25 | 2.25 | — | 4.5 | Polyethyleneglycol |
| 10 | 6 | — | 3 | 4.5 | Polyethyleneglycol |
| 11 | 2.5 | 2.5 | — | 4.5 | n-Butanol |
| 12 | 6.2 | — | 3.2 | 4.5 | n-Butanol |

| | cream sec | rise time sec | | density kg/m³ | |
|---|---|---|---|---|---|
| 1 | 45 | 6 | | 5.8 | |

Table B-continued

| 2 | 31 | 5 | 15.4 |
|---|----|---|------|
| 3 | 54 | 6 | 9.0 |
| 4 | 43 | 5 | 9.2 |
| 5 | 60 | 5 | 12.9 |
| 6 | 53 | 4 | 11.7 |
| 7 | 47 | 5 | 31.5 |
| 8 | 39 | 5 | 8.0 |
| 9 | 55 | 4 | 28.2 |
| 10 | 45 | 4 | 23.5 |
| 11 | 33 | 4 | 16.8 |
| 12 | 35 | 4 | 7.7 |

EXAMPLE 3

A liquid furfuryl alcohol-formaldehyde resin was prepared according to U.S. Pat. No. 2,874,148 example 1.

a. Preparation of furfuryl alcohol formaldehyde resin.

375 g of a 37% by weight formaldehyde solution were mixed with 5 cm$^3$ H$_2$SO$_4$ (10% by weight) in a 2 l flask provided with stirrer, thermometer, reflux condenser, separating funnel, and heating mantle. The mixture was heated to 93° C. 750 g furfuryl alcohol were then added over a period of 45 min from the separating funnel, the temperature of the mixture being held between 93° C. and 98° C. The mixture was neutralized with 3.9 cm$^3$ 10% by weight NaOH, and cooled to room temperature. The aqueous layer was discarded, and residual water removed from the resin by vacuum distillation. The resin was mixed with additional furfuryl alcohol to give a final content of 32 percent by weight of the furfuryl alcohol. The yield was 725 g of resin having a viscosity of 130 cps at 20° C.

b. Preparation of foam.

To 200 gram of this solution were added 8 gram paraformaldehyde, 2 gram silicone surfactant, and 12 cm$^3$ of a liquid catalyst consisting of 1 part by weight sulphuric acid (98% by weight) and 3 parts by weight batanediol.

The cream time was 15 sec, rise time 5 sec, and density of the foam 20 kg/m$^3$.

Three samples of this foam were compared with a commercial phenol formaldehyde foam in the propane torch test described in example 1.

the results obtained were:

Table C

| | Density of foam kg/m$^3$ | Time to burn through a 1" sample sec. | Time to burn through the unit density sec./kg/m$^3$ |
|---|---|---|---|
| Furan foam | | | |
| Sample 1 | 20 | 900 | 45.0 |
| Sample 2 | 20 | 720 | 36.0 |
| Sample 3 | 20 | 88.7 | 4.35+) |
| Phenol formaldehyde foam | | | |
| Sample 1 | 23.0 | 17.8 | 0.77+) |
| Sample 2 | 21.0 | 32.2 | 1.53 |
| Sample 3 | 17.7 | 31.0 | 1.75 |

+)Sample cracked open during test.

EXAMPLE 4

A foam was prepared by blending 80 g of furfuryl alcohol
20 g of methanol
1 g of silicone surfactant.

To this was added 5 g of concentrated sulphuric acid under vigorous stirring. During the addition of the catalyst hard lumps were formed in the mixture. After 25 sec. the mixture started to expand, but due to a too slow cure the foam collapsed. The gas evolution during the reaction corresponds to a foam density of below 10 k/m$^3$, but due to the collapse the final foam had a density of 120 kg/m$^3$.

The cell structure of the foam was very irregular due to the lump formation and cell collapse.

Another foam was prepared using the same formulation except that the catalyst consisted of 5 g of concentrated sulphuric acid diluted with 10 g of propan-2-ol.

This modified catalyst could be distributed without formation of lumps. The foam expanded but again collapse and cell rupture were observed resulting in a foam having a density of 95 kg/m$^3$ and a very irregular cell structure.

EXAMPLE 5

42.0 Durez 16470 containing about 5% by weight free furfuryl alcohol were mixed with 8.0 g furfuryl alcohol. To the mixture were added 2 g paraformaldehyde, 1 g silicone surfactant, 6 g Freon, 10 g finely divided flint, and 5 g boric acid. The catalyst was made by dissolving 1 g p-toluene-sulphonic acid in 7 g o-phosphoric acid (89% by weight), and it was added to the mixture over a period of 5 sec. After 20 sec. the foam started to rise, and the rise time was 10 sec. Foam density was 38 kg/m$^3$. In the muffle furnace test a small flame was noted from 1 sec. to 10 sec. After that the sample did not burn in the test period of 120 sec. Another foam, prepared in exactly the same way except that the pure Durez resin was used without addition of furfuryl alcohol, had a density of 52 kg/m$^3$. This foam burned after 1.5 sec. and throughout the entire period at 650° C. in the muffle furnace.

EXAMPLE 6

A tack-free rigid cellular furan resin was prepared from:

| | |
|---|---|
| Furfuryl alcohol | 50 g |
| Silicone MS 2557 *) | 1 g |
| Magnesium sulphate (dried) | 8 g |
| Paraformaldehyde | 4 g |
| Liquid Acid Catalyst | |
| Sulphuric Acid | 6 g |
| Propan-2-ol | 18 g |

*)Silicone MS 2557 supplied by Midland Silicones Ltd.

The liquid acid catalyst was prepared by adding concentrated sulphuric acid dropwise with stirring and cooling into the propan-2-ol.

To the furfuryl alcohol contained in a 250 cm$^3$ beaker at room temperature was added the silicone cell control agent, the finely divided magnesium sulphate (dried) and the paraformaldehyde, and was rapidly stirred with a mechanical agitator until uniformly dispersed.

To the resultant mixture with continued stirring was added the liquid acid catalyst over a period of 5 seconds. After 10 seconds the resin changes to a reddish colour at which stage it was transferred to an aluminium foil tray of dimensions 100 mm by 80 mm by 50 mm high. After 40 seconds from the moment of addition of the liquid acid catalyst, the resin rose over a period of 5 seconds to yield a tack free rigid cellular furan resin of density 3.8 kg/m$^3$.

EXAMPLE 7

A cellular furan resin was prepared from:

| | |
|---|---|
| Furfuryl alcohol | 50 g |
| Silicone MS 2557 | 1 g |
| Magnesium Sulphate (dried) | 8 g |
| Paraformaldehyde | 4 g |
| Liquid Acid Catalyst | |
| Tetraphosphoric Acid | 10 g |
| Propan-2-ol | 6 g |

The liquid acid catalyst was prepared by dissolving the tetraphosphoric acid in the propan-2-ol and allowed to stand for 24 hours before use.

To the furfuryl alcohol contained in a 250 cm³ beaker at room temperature was added the silicone cell control agent, the finely divided magnesium sulphate (dried) and the paraformaldehyde, and was rapidly stirred with a mechanical agitator uniformly dispersed. To the resultant mixture with continued stirring were added the liquid acid catalyst over 20 seconds. After 30 seconds the straw coloured liquid changed to a reddish colour and it was transferred to an aluminium foil tray measuring 100 mm by 80 mm by 50 mm high. After 105 seconds from the addition of the liquid acid catalyst, the resin rose in 10 seconds to yield a cellular furan resin of density 4 kg/m³.

A 25 mm cube of the sample was placed in a Carbolite Electric Furnace having internal dimensions 180 mm by 120 mm by 300 mm and an opening of 78 mm by 70 mm and at a temperature of 500° C. for a period of 2 minutes and the sample did not burn.

A 10 mm thick sample was subjected to a Propane Flame of 1200° C. and the sample did not melt or burn.

EXAMPLE 8

A cellular furan resin was prepared from:

| | |
|---|---|
| Furfuryl alcohol | 50 g |
| Silicone MS 2557 | 1 g |
| Magnesium Sulphate (dried) | 8 g |
| Liquid Acid Catalyst | |
| Tetraphosphoric Acid | 8 g |
| Sulphuric acid | 4 g |
| Propan-2-ol | 12 g |

The liquid acid catalyst is prepared by dissolving the tetraphosphoric acid in the propanol and then adding with stirring and cooling the concentrated sulphuric acid and was allowed to stand for 24 hours, at room temperature before use.

To the furfuryl alcohol contained in a 250 cm³ beaker at room temperature was added the silicone cell control agent MS 2557 and the finely divided magnesium sulphate (dried) and rapidly stirred with a mechanical agitator until uniformly dispersed. To the resulting mixture were added the liquid acid catalyst over a period of 5 seconds and was then transferred to an aluminium foil tray measuring 100 mm by 80 mm by 50 mm high. After 11 seconds from the moment of addition of the acid catalyst the foam rose rapidly to produce a cellular furan resin of density 4 kg/m³.

A 30 mm thick sample was cut from the foam and compressed to 10% of its original thickness and yielded a felt-like material. This material is useful as a fireproof acoustical insulator.

EXAMPLE 9

A cellular furan resin was prepared from:

| | |
|---|---|
| Furfuryl alcohol | 70 g |
| Silicone MS 2557 | 1,5 g |
| Magnesium sulphate (dried) | 12 g |
| Paraformaldehyde | 6 g |
| Liquid Acid Catalyst | |
| Orthophosphoric Acid (87%) | 10 g |
| Sulphuric Acid | 5 g |
| Propan-2-ol | 15 g |

The liquid acid catalyst was prepared by dissolving the orthophosphoric acid in the propan-2-ol and slowly adding with stirring and cooling the concentrated sulphuric acid, and allowed to stand for 24 hours. To the furfuryl alcohol in a 250 cm³ beaker at room temperature were added the silicone cell control agent, the finely divided magnesium-sulphate (dried) and the araformaldehyde and was rapidly stirred with a mechanical agitator, until uniformly dispersed.

To the resultant mixture with continued stirring were added the liquid acid catalyst over a period of 10 seconds. The liquid was then stirred for another 10 seconds at which time it was transferred to a suitably aluminium mold having internal dimensions 200 mm by 25 mm. After a further 2 minutes the resin was removed from the mould. It was then allowed to cure slowly at room temperature for 2 days. The density of the cellular furan resin was 63 kg/m³, and its compressive stress when tested according to I.S.O. Draft Recommendation No. 752 at 2 mm/min. cross head speed at 10% compression was 3,400 Newtons per square meter.

EXAMPLE 10

A series of cellular furan resins were prepared from various levels of furfuryl alcohol and furfuryl alcohol resin which had been prepared according to Example 2.

The formulation in all the preparations was

| | |
|---|---|
| Resin | 50 g |
| Paraformaldehyde | 5 g |
| Silicone MS 2557 | see Table D |
| Magnesium sulphate | 16 g |
| Liquid Acid Catalyst | |
| Orthophosphoric acid | |
| (87% by weight) | 3.7 g |
| Sulphuric acid | 1.8 g |
| Butan-1-ol | 5.5 g |

The liquid acid catalyst was prepared by dissolving the orthophosphoric acid (87% by weight) in the butan-1-ol and adding with cooling and stirring the sulphuric acid, and allowing to stand for 24 hours before use.

The procedure as carried out in Example 6 was repeated for each formulation as shown in Table D.

Table D

| Furfuryl Alcohol | Furfuryl Alcohol Prepolymer | Silicone g | Cream Time Seconds | Density kg/m³ |
|---|---|---|---|---|
| 40 | 10 | 2 | 35 | 10 |
| 30 | 20 | 2 | 25 | 16 |
| 20 | 30 | 2 | 20 | 55 |
| 10 | 40 | 4 | 20 | 780 |

EXAMPLE 11

| | |
|---|---|
| Durez 16470 | 40 g |
| Furfuryl alcohol | 10 g |
| Paraformaldehyde | 2 g |
| Silicone surfactant (DC 193) | 1 g |
| Kaolin | 5 g |
| Fe-powder | 10 g |
| O-H₃ PO₄ | 4 g |
| p-toluenesulphonic acid | 2 g |

| | |
|---|---|
| 1.4-Butanediol | 4 g |

The liquid acid catalyst was prepared by dissolving the p-toluenesulphonic acid in the O-$H_3PO_4$ and the acid-mixture was mixed into the 1.4-Butanediol with cooling and stirring.

The resin, the alcohol, paraformaldehyde, silicone surfactant, kaolin and Fe-powder were mixed in a 500 cm³ polystyrene-beaker and the acid catalyst was added from a syringe under rapid stirring. After 30 sec. the mixture was poured into an aluminium mould and allowed to rise. The specific gravity of the foam was 28. A foam sample of about 50 × 30 × 10 mm could be lifted by a small permanent magnet and would stick to the magnet.

EXAMPLE 12

| | |
|---|---|
| Resin WK 90310 | 25 g |
| Paraformaldehyde | 2.5 g |
| Silicone DC 193 | 0.5 g |
| Kaolin | 10 g |
| Liquid Acid Catalyst | |
| $H_2SO_4$ | 1.8 g |
| Butylcellesolve | 0.9 g |

The liquid acid catalyst was prepared by adding dropwise 1,8 g of concentrated sulphuric acid into 0,9 g of butylcellesolve (2-butoxy-ethanol). The resin WK 90310 was prepared by the procedure described in example 2.

The viscosity was 1150 cp at 25° C.

Resin, paraformaldehyde, silicone and kaolin were mixed with rapid stirring and the acid catalyst added. The resulting foam had a specific gravity of 94.

In the propane torch test a stable white ceramic skeleton was formed which prevented the flame from penetrating the foam for a period of 2 hours. Upon cooling the ceramic material fell apart as a white powder.

EXAMPLE 13

Preparation of furan-resin.

35 kg of furfuryl alcohol and 10 kg of water was charged to a 45 l reaction vessel equipped with mantle, stirrer, thermometer and vacuum distillation equipment.

The mixture was heated to 65° C. and sulphuric acid (1 normal) was added until a pH between 2.4 and 2.5 was reached. During the entire reaction period the pH was measured and kept at 2.4–2.5. After 4 hours the temperature was raised to 85 C.

The reaction was followed by measuring the refractive index of the resin-phase. At a refractive index of 1.5400 the reaction was stopped by neutralizing with sodium hydroxide. The aqueous layer was separated and discarded, and residual water removed by vacuum-distillation. The resin was a clear red-brown liquid having a viscosity of 1250 cps (25° C.) and an OH-equivalent weight of 356.

Foams were prepared using this resin and the formulations given in Table G.

The foams were tested in the muffle furnace test described in example 1.

It appears that the foams containing less than 50 percent of hydroxyl groups from free furfurylalcohol ignite almost immediately and burn for the entire test period, whereas the foam containing 50 percent hydroxyl groups from free-furfuryl-alcohol burns for a very short period only. The foam made with 60 percent hydroxyl groups from free furfurylalcohol does not ignite in the test.

What is claimed is:

1. In a process for preparing polyfuran foams by polymerizing or copolymerizing furfuryl alcohol, either alone or in combination with prepolymers or precopolymers of furfuryl alcohol, as liquid feed material in the presence of a liquid acidic compound or mixture of acidic compounds, the improvement which comprises:
   (a) utilizing as the liquid feed material a furfuryl alcohol-containing mixture containing at least 20% of free furfuryl alcohol substantially free of other alcohols, wherein at least 50% of the hydroxyl groups in the mixture are present as free furfuryl alcohol, said mixture having a maximum viscosity of 1150 cp at 25° C. when containing about 50% hydroxyl groups as free furfuryl alcohol; and
   (b) adding at least 6% by weight of an oxy-acid of phosphorous as the acidic compound or mixture of acidic compounds to the feed material; said acidic compound or mixture of acidic compounds having a pKa value in water of from 1 to 4; to obtain a stable, low density polyfuran foam having non-flammability characteristics as determined by the muffle furnace test.

2. A process according to claim 1 wherein said acidic compound or a mixture of acidic compounds is uniformly distributed in mono alcohols that do not poly- Table G

| Foam No. | a | b | c | d |
|---|---|---|---|---|
| o/o hydroxy groups from furfuryl alcohol | 30 | 40 | 50 | 60 |
| o/o hydroxy groups from furar resin | 70 | 60 | 50 | 40 |
| furfurylalcohol, g | 5.4 | 7.9 | 11.0 | 14.8 |
| furan resin, g | 44.7 | 42.1 | 39.0 | 35.2 |
| paraformaldehyde, g | 2 | 2 | 2 | 2 |
| silicone surfactant, g | 1 | 1 | 1 | 1 |
| talc, g | 10 | 10 | 10 | 10 |
| freon 113, g | 6 | 6 | 6 | 6 |
| phosphoric acid (87 c/o), g | 8 | 8 | 8 | 8 |
| conc. sulphuric acid, g | 4 | 4 | 4 | 4 |
| propan-2-ol, g | 12 | 12 | 12 | 12 |
| cream time, sec. | 41 | 40 | 42 | 42 |
| rise time, sec. | 11 | 6 | 7 | 6 |
| density, kg/square ee cubic m | 32.2 | 28.5 | 21.0 | 17.0 |
| muffle furnace test at 650° C: | | | | |
| time to ignite, sec. | 2s) | 2s) | 3 | 120 t) |
| time to extinguish, sec. | 120 t) | 120 t) | 10 | | s) = Less than
t) = More than merize in the presence of said acidic compound or mixture of acidic compounds.

3. A process according to claim 1, wherein said furfuryl alcohol mixture has a viscosity of less than 250 cp. at 25° C.

4. A process according to claim 1 wherein said precopolymer is the reaction product of furfuryl alcohol and furfural or formaldehyde.

5. A process according to claim 1 wherein said acidic compound or mixture of acidic compounds comprises a strong acid.

6. In a process for preparing polyfuran foams by polymerizing or copolymerizing furfuryl alcohol, either alone or in combination with prepolymers or precopolymers of furfuryl alcohol, as liquid feed material in the presence of a liquid acidic compound or mixture of acidic compounds, the improvement which comprises:

(a) utilizing as the liquid feed material a mixture containing at least 20% of free furfuryl alcohol, said mixture being substantially free of other alcohols, and having a maximum viscosity of 1150 cp at 25° C.; and (b) adding at least 6% by weight of an oxy-acid of phosphorous as the acid compound or mixture of acidic compounds to the feed material, said acidic comound or mixture of acidic compounds having a pKa value in water of less than 1 and being uniformly distributed in mono alcohols that do not polymerize in the presence of said acidic compound or mixture of acidic compounds; to obtain a stable, low density polyfuran foam having nonflammability characteristics as determined by the muffle furnace test.

* * * * *